United States Patent [19]

Yamamoto et al.

[11] Patent Number: 5,700,879
[45] Date of Patent: Dec. 23, 1997

[54] FLUORINE-CONTAINING ELASTOMER COMPOSITION

[75] Inventors: Yuichi Yamamoto; Haruyoshi Tatsu, both of Ibaraki, Japan; Volkova Margarita Alexeevna, Saint Petersburg, Russian Federation; Sokolov Sergey Vasilyevich, Saint Petersburg, Russian Federation; Veretennikov Nikolai Vladimirovich, Saint Petersburg, Russian Federation

[73] Assignees: The Central Synthetic Rubbers Research Institute, Saint Petersburg, Russian Federation; Nippon Mektron Limited, Tokyo, Japan

[21] Appl. No.: 543,502

[22] Filed: Oct. 16, 1995

[30] Foreign Application Priority Data

Oct. 21, 1994 [JP] Japan .................. 6-282940

[51] Int. Cl.$^6$ .................................... C08F 8/34
[52] U.S. Cl. .................. 525/353; 525/326.3; 525/380; 525/381; 525/382
[58] Field of Search .................. 525/353, 380, 525/381, 382

[56] References Cited

U.S. PATENT DOCUMENTS

| 3,933,767 | 1/1976 | Nottke . |
| 4,031,124 | 6/1977 | Nottke . |
| 4,138,426 | 2/1979 | England . |

FOREIGN PATENT DOCUMENTS

| 0 606 883 A1 | 1/1994 | European Pat. Off. . |
| 59-109546 | 12/1982 | Japan . |
| 6-263952 | 9/1994 | Japan . |

*Primary Examiner*—Bernard Lipman
*Attorney, Agent, or Firm*—Barnes & Thornburg

[57] ABSTRACT

A fluorine-containing elastomer composition, which comprises a terpolymer of tetrafluoroethylene, perfluoro(lower alkyl vinyl ether) and cyano group-containing (perfluorovinylether) represented by the following general formula:

$$CF_2=CF[OCF_2CF(CF_3)]_nCN$$

wherein n is an integer of 1 to 5, and a bis(aminophenyl) compound represented by the following general formula as a cross-linking agent:

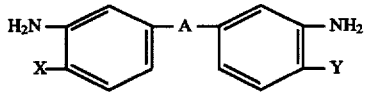

, wherein A is, for example, an alkylidene group, and X and Y are a hydroxyl group or an amino group, can produce vulcanized products having a good heat resistance and good physical properties, and the bis (aminophenyl) compound has no problem as to its safety.

3 Claims, No Drawings

FLUORINE-CONTAINING ELASTOMER COMPOSITION

BACKGROUND OF THE INVENTION

1. Field of the invention

The present invention relates to a fluorine-containing elastomer composition, and more particularly to a cross-linkable composition of fluorine-containing elastomer having cyano groups as cross-linkable groups.

2. Related Prior Art

JP-A-59-109546 discloses a fluorine-containing elastomer composition which comprises a terpolymer of tetrafluoroethylene, perfluoro(methyl vinyl ether) and cyano group-containing (perfluorovinylether) represented by the following general formula:

$CF_2=CF[OCF_2CF(CF_3)]nO(CF_2)mCN$ wherein n: 1–2 and m: 1–4
and a bis(aminophenyl) compound represented by the following general formula as a cross-linking agent:

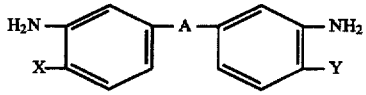

wherein A is an alkylidene group having 1 to 6 carbon atoms, a perfluoroalkylidene group having 1 to 10 carbon atoms, a $SO_2$ group, an O group, a CO group or a carbon-carbon bond capable of directly bonding two benzene rings, and X and Y are hydroxyl groups or amino groups.

However, the cyano group-containing (perfluorovinylether), copolymerized as the cross-linking site monomer in the terpolymer, is synthesized through many steps, as disclosed in U.S. Pat. No. 4,138,426 and thus is never regarded as an industrially advantageous raw material.

On the other hand, U.S. Pat. No. 3,933,767 discloses a terpolymer of tetrafluoroethylene, perfluoro(methyl vinyl ether) and cyano group-containing (perfluorovinylether) represented by the following general formula as a cross-linking site monomer:

$CF_2=CF[OCF_2CF(CF_3)]$ nCN (wherein n: 1–5)
and also discloses that the cross-linking can be carried out with tetraphenyl tin.

The cyano group-containing (perfluorovinylether) used as the comonomer component for the terpolymer can be readily synthesized from the corresponding $CN[CF(CF_3)CF_2O]nCF$ $(CF_3)COF$ with a good selectivity, but the cross-linking of the thus obtained terpolymer is carried out .with highly toxic tetraphenyl tin, and thus there are still problems of industrial safety and slow cross-linking speed. Furthermore, the thus obtained cross-linked products have less resistances to water and to amine at an elevated temperature.

SUMMARY OF THE INVENTION

An object of the present invention is to provide a fluorine-containing elastomer composition capable of producing vulcanized rubber products having a good heat resistance and good physical properties with a commercially available, ordinary cross-linking agent free from any safety problem, as contained therein, the composition comprising a cross-linking site monomer which can be readily synthesized with a good selectivity.

According to the present invention, there is provided a fluorine-containing elastomer composition, which comprises a terpolymer of tetrafluoroethylene, perfluoro(lower alkyl vinyl ether) and a cyano group-containing (perfluorovinylether) represented by the following general formula:

$CF_2=CF[OCF_2CF(CF_3)]nCN$

, wherein n is an integer of 1 to 5 and a bis(aminophenyl) compound represented by the following general formula as a cross-linking agent:

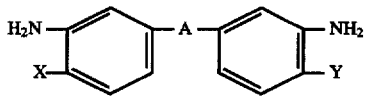

, wherein A is an alkylidene group having 1 to 6 carbon atoms, a perfluoroalkylidene group having 1 to 10 carbon atoms, a $SO_2$ group, an O group, a CO group or a carbon-carbon bond of directly combined two benzene rings, and X and Y are a hydroxyl group or an amino group.

DETAILED DESCRIPTION OF THE INVENTION

The terpolymer of tetrafluoroethylene, perfluoro(lower alkyl vinyl ether) and cyano group-containing (perfluorovinylether) for use in the present invention includes, for example, the one comprising about 45 to about 75% by mole of tetrafluoroethylene, about 50 to about 25% by mole of perfluoro-(lower alkyl vinyl ether) and about 0.1 to about 5% by mole of cyano group-containing (perfluorovinylether) as a cross-linking site monomer, sum total being 100% by mole. The terpolymer can further contain various vinyl compounds and fluorinated olefins, as copolymerized to such a degree as not to inhibit the copolymerization reaction or impair the physical properties of vulcanized products.

About 0.1 to about 10 parts by weight, preferably about 0.5 to about 5 parts by weight, of at least one of the following compounds is added to 100 parts by weight of the terpolymer as a bis(aminophenyl) compound represented by the following general formula.

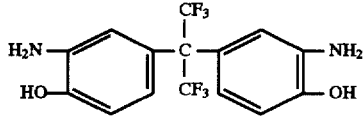

[hereinafter referred to as bis(aminophenol)AF]

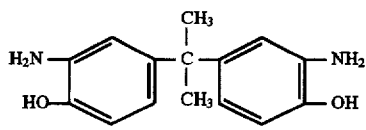

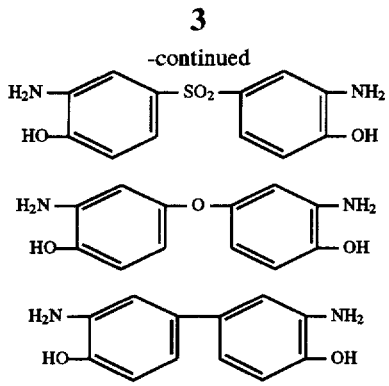

[hereinafter referred to as bis (aminophenol)]

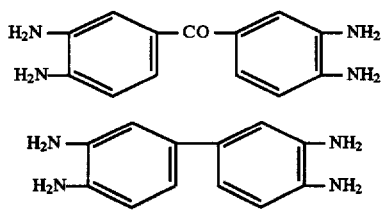

The fluorine-containing elastomer composition comprising the above-mentioned components as essential ones can further contain an inorganic filler such as carbon black, silica, etc., an acid acceptor such as oxide, hydroxide or stearate of a divalent metal, litharge, etc., and other additives, as desired. The composition can be prepared by kneading in rolls, kneader, Bambury mixer, etc. Cross-linking of the composition is carried out by heating at about 100° to about 250° C. for about 1 to about 120 minutes. Secondary vulcanization, when desired, is preferably carried out at about 150° to about 280° C. for not more than about 30 hours in an inert atmosphere such as a nitrogen atmosphere.

The present inventors disclose in JP-A-6-263952 that a perfluoro(ω-cyanoalkyl vinyl ether) represented by the general formula: $CF_2=CFO(CF_2)nCN$ (wherein n: 2–12) is copolymerized as a cross-linking site monomer in place of the cyano group-containing (perfluorovinylether) disclosed in aforementioned JP-A-59-109546 with tetrafluoroethylene, perfluoro(lower alkyl vinyl ether) and a bis(aminophenyl) compound represented by the foregoing general formula is used as a cross-linking agent for the terpolymer.

The nitrile group of the above-mentioned terpolymer is a primary nitrile group, whereas the nitrile group of the present terpolymer is a secondary nitrile group, which has been considered to hardly form an oxazole ring with an o-aminophenol compound due to the steric hindrance and to be not practical [Journal of Fluorine Chemistry, Vol. 8 Page 295 (1976)].

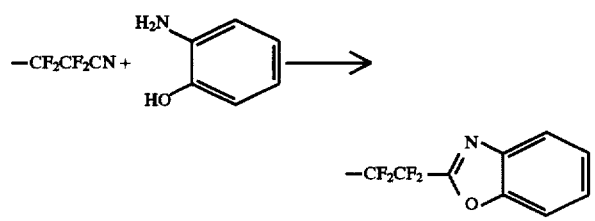

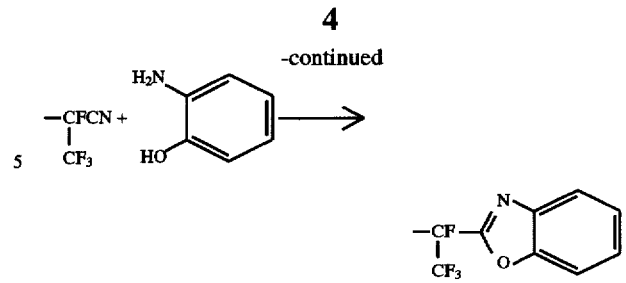

The secondary nitrile group of the present terpolymer has a higher selectivity to the oxazole ring formation reaction than that of the primary nitrile group and can be attained the improvement of compression set characteristics.

According to the present invention, there is provided a fluorine-containing elastomer composition capable of producing vulcanized rubber products having a good heat resistance and good physical properties with a commercially available, ordinary cross-linking agent free from any safety problem, as contained therein, the composition comprising a cross-linking site monomer which can be readily synthesized with a good selectivity.

PREFERRED EMBODIMENTS OF THE INVENTION

The present invention will be described in detail below, referring to Reference Examples, Examples and Comparative Example.

REFERENCE EXAMPLE 1

4000 ml of distilled water, 50 g of ammonium perfluorooctanoate, and 88 g of $Na_2HPO_4 \cdot 12H_2O$ were charged into a stainless steel autoclave having a capacity of 10 liters, and then the autoclave inside gas was replaced with a nitrogen gas. Then, the autoclave was subjected to pressure reduction, and cooled down to about −50° C. Then, 250 g of perfluoro (8-cyano-5-methyl-3,6-dioxa-1-nonene) [CNVE], 1660 g of perfluoro(methyl vinyl ether) [FMVE] and 560 g of tetrafluoroethylene [TFE] were successively charged therein, and then autoclave was heated to 65° C. Then, 500 ml of an aqueous solution containing 15 g of sodium sulfite and 500 ml of an aqueous solution containing 75 g of ammonium persulfate were charged therein to start polymerization reaction. 8 hours after the start polymerization reaction, the same amounts of the aqueous sodium sulfite solution and the ammonium persulfite solution as above were charged again therein. After the polymerization reaction was continued for 20 hours, the unreacted gas was purged from the autoclave and the formed aqueous latex was taken out from the autocalve. The latex was salted out with an aqueous 10% sodium chloride solution and dried, whereby 620 g of white, rubbery terpolymer A was obtained.

It was found by infrared absorption spectrum analysis that the terpolymer A had a copolymer composition comprising 61.9 mol % of TFE, 37.0 mol % of FMVE and 1.1 mol % of CNVE (characteristic absorption of nitrile group: 2268 $cm^{-1}$).

REFERENCE EXAMPLE 2

The polymerization reaction was conducted in the same manner as in Reference Example 1, except that in Reference Example, 350 g of perfluoro(8-cyano-5-methyl-3,6-dioxa-1-octene) [FCVE] was used in place of CNVE, whereby 460 g of white, rubbery terpolymer B having a copolymer composition comprising 67.7 mol % of TFE, 30.9 mol % of FMVE and 1.4 mol % of FCVE was obtained.

EXAMPLES 1 and 2

The following components were kneaded in a double roll rubber mill and subjected to primary vulcanization (press vulcanization) at 160° C. for 30 minutes and secondary vulcanization at 230° C. for 22 hours:

| Terpolymer A | 100 parts by weight | |
| --- | --- | --- |
| Bis(aminophenol)AF | 1 part by weight | (for Ex. 1) |
| Bis(aminophenol) | 1 part by weight | (for Ex. 2) |
| MT carbon black | 20 parts by weight | |

The thus obtained vulcanized sheets were subjected to measurement of normal state physical properties according to JIS K-6301, and also to measurement of compression set (by 75% compression of P-24 O-ring) and heat resistance (changes in the normal physical properties after hot ageing at 275° C. for 70 hours).

COMPARATIVE EXAMPLE

The following components were kneaded in a double roll rubber mill and subjected to primary vulcanization (press vulcanization) at 190° C. for 60 minutes and secondary vulcanization of long duration at 100° to 200° C. for 6 hours—200° C. for 18 hours—200° to 280° C. for 6 hours—280° C. for 18 hours.

| Terpolymer B | 100 parts by weight |
| --- | --- |
| Bis(aminophenol)AF | 2 parts by weight |
| Dicyclohexyl-18-Crown-6 | 0.5 part by weight |
| MT carbon black | 10 parts by weight |
| Litharge (PbO) | 2 parts by weight |

The thus obtained vulcanized sheets was subjected to the same measurement as in Examples 1 and 2.

Results of measurement in Examples 1 and 2, and Comparative Example are shown in the following Table.

TABLE

| Measurements | Ex. 1 | Ex. 2 | Comp. Ex. |
| --- | --- | --- | --- |
| [Normal state physical properties] | | | |
| Hardness (JIS-A) | 75 | 74 | 77 |
| 100% modulus (kg/cm²) | 76 | 45 | 71 |
| Tensile strength (kg/cm²) | 179 | 110 | 136 |
| Elongation (%) | 153 | 170 | 140 |
| [Compression set; %] | | | |
| 200° C. for 70 hrs | 10 | 20 | 39 |
| 200° C. for 140 hrs | 14 | 29 | 45 |
| 250° C. for 70 hrs | 13 | 30 | 44 |
| 275° C. for 70 hrs | 15 | 31 | 49 |
| [Hot ageing test] | | | |
| Hardness change (point) | +1 | +1 | +2 |
| 100% modulus change (%) | +4 | +4 | −4 |
| Tensile strength change (%) | −7 | +2 | +35 |
| Elongation change (%) | −3 | −1 | +25 |

What is claimed is:

1. A fluorine-containing elastomer composition, which comprises a terpolymer of tetrafluoroethylene, perfluoro (lower alkyl vinyl ether) and cyano group-containing (perfluorovinylether) represented by the following general formula:

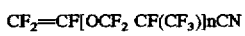

, wherein n is an integer of 1 to 5, and a bis(aminophenyl) compound represented by the following general formula as a cross-linking agent:

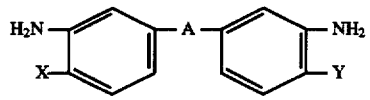

, wherein A is an alkylidene group having 1 to 6 carbon atoms, a perfluoroalkylidene group having 1 to 10 carbon atoms, a $SO_2$ group, an O group, a CO group or a carbon-carbon bond of directly bonded two benzene rings, and X and Y are a hydroxyl group or an amino group.

2. A fluorine-containing elastomer composition according to claim 1, wherein the terpolymer is one comprising about 45 to about 75% by mole of tetrafluoroethylene, about 50 to about 25% by mole of perfluoro(lower alkyl vinyl ether) and about 0.1 to about 5% by mole of cyano group-containing (perfluorovinylether), sum total being 100% by mole.

3. A fluorine-containing elastomer composition according to claim 1, wherein about 0.1 to about 10 parts by weight of the bis(aminophenyl) compound is contained as the cross-linking agent per 100 parts by weight of the terpolymer.

* * * * *